US012728552B2

(12) United States Patent
Van Den Berg et al.

(10) Patent No.: US 12,728,552 B2
(45) Date of Patent: Sep. 8, 2026

(54) ADJUSTING A RELATIVE POSITION IN AN EXPOSURE DIRECTION OF TWO PIVOTABLY ARRANGED MEMBERS OF A SHAVING UNIT

(71) Applicant: KONINKLIJKE PHILIPS N.V., Eindhoven (NL)

(72) Inventors: Thomas Sjoerd Van Den Berg, Enschede (NL); Eelco Arminak Galestien, Drachten (NL); Michel Van Es, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 154 days.

(21) Appl. No.: 18/556,781

(22) PCT Filed: May 17, 2022

(86) PCT No.: PCT/EP2022/063224
§ 371 (c)(1),
(2) Date: Oct. 23, 2023

(87) PCT Pub. No.: WO2022/248279
PCT Pub. Date: Dec. 1, 2022

(65) Prior Publication Data
US 2024/0217127 A1 Jul. 4, 2024

(30) Foreign Application Priority Data
May 28, 2021 (EP) .................................... 21176656

(51) Int. Cl.
*B26B 19/14* (2006.01)

(52) U.S. Cl.
CPC .................................. *B26B 19/145* (2013.01)

(58) Field of Classification Search
CPC .................................................... B26B 19/145
See application file for complete search history.

(56) References Cited

U.S. PATENT DOCUMENTS 3,263,328 A 8/1966 Craig
5,577,324 A * 11/1996 Tanaka .................. B26B 19/146
30/43.6

(Continued)

FOREIGN PATENT DOCUMENTS

EP 0484795 A1 5/1992
EP 3486047 A1 5/2019

(Continued)

OTHER PUBLICATIONS

International Search report and Written Opinion of PCT/EP2022/063224, dated Sep. 26, 2022.

*Primary Examiner* — Ghassem Alie
*Assistant Examiner* — Richard D Crosby, Jr.

(57) ABSTRACT

A hair-cutting unit has an external cutting member (10) having a shaving surface (11) provided with hair-entry openings and a skin supporting member (30) having a skin supporting surface (31) surrounding the external cutting member (10). The hair-cutting unit is further equipped with an adjustment mechanism (50) configured to adjust an exposure distance over which the shaving surface (11) protrudes relative to the skin supporting surface (31) in an exposure direction (E). The external cutting member (10) and the skin supporting member (30) are jointly pivotal about a stationary pivot axis. The adjustment mechanism (50) is designed such that the stationary character of the pivot axis can be maintained for every possible relative position of the external cutting member (10) and the skin supporting member (30), so that a well-functioning combination of the adjustment mechanism (50) and the pivoting arrangement of the respective members (10, 30) is realized.

15 Claims, 10 Drawing Sheets

(56) References Cited

U.S. PATENT DOCUMENTS

| | | | | |
|---|---|---|---|---|
| 5,687,481 | A | 11/1997 | De Boer et al. | |
| 6,568,083 | B1 | 5/2003 | Taniguchi et al. | |
| 7,152,324 | B2 * | 12/2006 | Uchiyama | B26B 19/145 30/43.6 |
| 7,370,420 | B2 * | 5/2008 | Shimizu | B26B 19/145 30/346.51 |
| 7,509,741 | B2 * | 3/2009 | Shimizu | B26B 19/141 30/346.51 |
| 7,743,508 | B2 | 6/2010 | Shimizu | |
| 8,191,264 | B2 * | 6/2012 | Veenstra | B26B 19/3846 30/346.51 |
| 8,230,601 | B2 * | 7/2012 | Shimizu | B26B 19/145 30/43.6 |
| 8,393,082 | B2 * | 3/2013 | Shimizu | B26B 19/146 30/527 |
| 9,174,349 | B2 * | 11/2015 | Schmitt | B26B 19/146 |
| 10,195,751 | B2 * | 2/2019 | Shimizu | B26B 19/145 |
| 11,465,301 | B2 * | 10/2022 | Horowitz | B26B 19/145 |
| 12,186,925 | B2 * | 1/2025 | Joosten | B26B 19/3886 |
| 2017/0144318 | A1 * | 5/2017 | Van Toor | B26B 19/145 |
| 2019/0337171 | A1 * | 11/2019 | Lap | B26B 19/145 |
| 2020/0361104 | A1 | 11/2020 | Paauw et al. | |
| 2022/0212358 | A1 | 7/2022 | Petrelli | |

FOREIGN PATENT DOCUMENTS

| | | | |
|---|---|---|---|
| WO | 02062538 | A1 | 8/2002 |
| WO | 2008010139 | A1 | 1/2008 |
| WO | 2014184065 | A1 | 11/2014 |
| WO | 2020229503 | A1 | 11/2020 |

* cited by examiner

ADJUSTING A RELATIVE POSITION IN AN EXPOSURE DIRECTION OF TWO PIVOTABLY ARRANGED MEMBERS OF A SHAVING UNIT

CROSS-REFERENCE TO PRIOR APPLICATIONS

This application is the U.S. National Phase application under 35 U.S.C. § 371 of International Application No. PCT/EP2022/063224, filed on May 17, 2022, which claims the benefit of European Patent Application No. 21176656.3, filed on May 28, 2021. These applications are hereby incorporated by reference herein.

FIELD OF THE INVENTION

The invention relates to a shaving unit configured to be used in an electric shaver, comprising a base member and at least one hair-cutting unit supported by the base member, wherein the hair-cutting unit comprises: an external cutting member having a shaving surface provided with hair-entry openings; an internal cutting member which is movable relative to the external cutting member; a skin supporting member having a skin supporting surface surrounding the external cutting member, and an adjustment mechanism configured to adjust an exposure distance over which the shaving surface protrudes relative to the skin supporting surface in an exposure direction.

Further, the invention relates to an electric shaver comprising a shaving unit as described here before and a body unit to which the shaving unit is couplable or coupled and in which components of a drive system configured to drive components of the shaving unit which are movably arranged in the shaving unit are accommodated.

BACKGROUND OF THE INVENTION

Electric shavers and shaving units for use in electric shavers are generally known. Electric shavers are generally used to shave body hair, which may be facial hair, and are powered by electric supply mains and/or by electric energy storage devices such as batteries.

In a generally known set-up, a shaving unit comprises a base member and at least one hair-cutting unit supported by the base member. Traditionally, the hair-cutting unit comprises a combination of an external cutting member having a shaving surface provided with hair-entry openings as a non-driven component and an internal cutting member as a driven component, wherein at least the internal cutting member has one or more cutting edges. In such a case, use of the shaving unit as incorporated in an electric shaver involves putting the shaving unit to an operation mode in which the internal cutting member of the hair-cutting unit is actually moved, and moving the shaving unit over the skin in such a way that the shaving surface of the external cutting member of the hair-cutting unit faces and contacts the skin. In the process, hairs protruding from the skin are caught in a space of the hair-cutting unit in which they are made to abut against the external cutting member at the position of a hair-entry opening and are cut through when they are encountered by a cutting edge of the internal cutting member.

In order to obtain good hair-cutting results, it is intended to cut the hairs at a position that is as close as possible to the skin. A downside of this general aspect of hair-cutting is that skin irritation may occur. EP 0 484 795 A1 discloses an electric shaver having a housing which comprises a holder for at least one combination of an external cutting member and an internal cutting member. The electric shaver also comprises an adjusting element by means of which the position of the combination of the external cutting member and the internal cutting member relative to the holder can be varied. By having the adjusting element, a user is enabled to influence the shaving performance of the electric shaver and the degree of skin irritation as a result of a shaving action according to personal preferences and in dependence of the characteristics of the skin and the hairs. In particular, the external cutting member is secured to a retaining plate, and the internal cutting member is retained between the retaining plate and the external cutting member. The extent to which the external cutting member projects from the holder can be varied by means of the adjustment element, which is arranged to enable the position of the retaining plate in the holder to be varied to that end. This is done manually by shifting an elastic annular band which is situated in a groove in the outer side of the holder and which comprises projections extending inwardly through apertures in the holder and engaging with the retaining plate, wherein the retaining plate is urged against the projections at the position of a stepped or continuously inclined contact surface of the retaining plate.

In the shaving unit of various known electric shavers other than the one known from EP 0 484 795 A1, the external cutting member and the skin supporting member are arranged so as to be pivotable relative to the base member to a certain extent, so as to facilitate the external cutting member and the skin supporting member in following a contour of an area of skin to be shaved. Details of a known electric shaver which is representative in this respect are described in WO 2008/010139 A1, to mention one example of various disclosures of the pivoting arrangement. It is an object of the invention to design a shaving unit in such a way that it is possible to have the two above-mentioned advantageous functionalities in the shaving unit, namely the functionality of adjusting an extent to which the shaving surface of the external cutting member protrudes relative to the skin supporting surface of the skin supporting member and the functionality of enabling contour following through a pivoting arrangement of both the external cutting member and the skin supporting member, without the one functionality being hampered by the other. The fact is that when it is considered to combine the two functionalities, it is found that changing the relative position of the members involves pivoting inaccuracy. This means that when the relative position of the members is set to be different from a neutral position, a pivoting movement of the members involves a loss of alignment of longitudinal axes of the members, which is highly undesirable and may lead to disadvantageous effects such as limitation of the pivoting movement, distortion and warping of parts of the members, creation of gaps between parts of the members, etc.

EP 3 486 047 A1 discloses a hair-cutting unit of a shaving device having an external cutting member with a shaving surface, an internal cutting member rotatable relative to the external cutting member about a rotational axis, a supporting member having a skin contacting surface surrounding the external cutting member, and a retaining component which is releasably couplable to the supporting member by means of a coupling structure. The retaining component is configured to retain the external cutting member in an operational position relative to the supporting member in an assembled condition of the hair-cutting unit. In said assembled condition, a circumferential flange of the external cutting member is retained, in an axial direction parallel to the rotational axis, between two guiding elements of the coupling structure, arranged in diametrically opposite positions on the retaining component, and two supporting elements arranged in diametrically opposite positions on the supporting member. The coupling structure further comprises two abutment elements arranged in diametrically opposite positions on the supporting member and for engagement with the two guiding elements of the retaining component. In the assembled condition, the two abutment elements each engage a first guiding surface of the respective guiding element that extends perpendicularly to the axial direction. As a result, the flange of the external cutting member is retained in a stationary axial position relative to the supporting member, wherein the shaving surface protrudes relative to the skin contacting surface in the axial direction over an exposure distance. To disassemble the hair-cutting unit, the user needs to rotate the retaining component about the rotational axis. As a result, the two abutment elements each engage a second guiding surface of the respective guiding element that extends obliquely to the axial direction. In this disassembled condition, the flange of the external cutting member can move in the axial direction between the two guiding elements of the retaining component and the two supporting elements on the supporting member. The oblique second guiding surfaces are configured such that, in the disassembled condition, the flange of the external cutting member is axially moveable relative to the supporting member over a distance which is at least equal to the exposure distance. As a result, a user is enabled to assemble the hair-cutting unit starting from a condition wherein the shaving surface of the external cutting member is flush with the skin contacting surface of the supporting member, in particular a condition wherein the hair-cutting unit is placed in an upside-down position on a flat surface.

SUMMARY OF THE INVENTION

In view of the foregoing, the invention provides a shaving unit configured to be used in an electric shaver, comprising a base member and at least one hair-cutting unit supported by the base member, wherein the hair-cutting unit comprises:

- an external cutting member having a shaving surface provided with hair-entry openings;
- an internal cutting member which is movable relative to the external cutting member,
- a skin supporting member having a skin supporting surface surrounding the external cutting member, and
- an adjustment mechanism configured to adjust an exposure distance over which the shaving surface protrudes relative to the skin supporting surface in an exposure direction;

wherein:

- the external cutting member and the skin supporting member are jointly pivotal about a pivot axis which has a stationary position relative to the base member;
- the adjustment mechanism comprises an adjustment member which is displaceable relative to the base member in a displacement direction in an imaginary plane perpendicular to the exposure direction for adjustment of the exposure distance;
- the adjustment member comprises a supporting surface which is inclined relative to the displacement direction;
- one of the external cutting member and the skin supporting member is a bearing-supported member supported relative to the base member via a bearing allowing a rotation of the bearing-supported member about the pivot axis; and
- the other one of the external cutting member and the skin supporting member is an adjustably supported member supported relative to the base member via the supporting surface of the adjustment member and a supporting element in supporting contact with the supporting surface of the adjustment member, wherein, in each position of the adjustment member relative to the base member in the displacement direction, a rotation of the adjustably supported member about the pivot axis is defined by mutual movement of the supporting surface of the adjustment member and the supporting element in supporting contact with each other.

The shaving unit according to the invention is designed in such a way that the functionality of the adjustment mechanism and the pivoting arrangement of the external cutting member and the skin supporting member can be combined without introducing the above-mentioned pivoting inaccuracy. The fact is that the external cutting member and the skin supporting member are jointly pivotal about a pivot axis which has a stationary position relative to the base member. Further, the adjustment mechanism comprises an adjustment member which is displaceable relative to the base member in a displacement direction in an imaginary plane perpendicular to the exposure direction for adjustment of the exposure distance, wherein the adjustment member comprises a supporting surface which is inclined relative to the displacement direction. On the basis of the inclined orientation of the supporting surface, an adjustment of the exposure distance can be compensated for as far as consequences to the pivoting arrangement of the one of the external cutting member and the skin supporting member which is displaced in the process are concerned, such that the member concerned can be at another position in the exposure direction and still be pivotable about the same, stationary pivot axis. Hence, the configuration is such that the pivot axis is not stationary on the member concerned, but is stationary on the base member instead, as indicated. When the exposure of the member concerned is increased, the pivot axis is further down relative to the member, and when the exposure of the member is decreased, the pivot axis is further up relative to the member.

The one of the external cutting member and the skin supporting member which is displaced during variation of the exposure distance is referred to as adjustably supported member, and the other of the external cutting member and the skin supporting member, i.e. the member which stays in place, is referred to as bearing-supported member. The bearing-supported member is supported relative to the base member via a bearing allowing a rotation of the bearing-supported member about the pivot axis. According to a notable aspect of the invention, the adjustably supported member is supported relative to the base member via the supporting surface of the adjustment member and a supporting element in supporting contact with the supporting surface of the adjustment member, wherein, in each position of the adjustment member relative to the base member in the displacement direction, a rotation of the adjustably supported member about the pivot axis is defined by mutual movement of the supporting surface of the adjustment member and the supporting element in supporting contact with each other. By supporting the adjustably supported member on the supporting surface of the adjustment member, it is achieved that variation of the position of the adjustably supported member in the exposure direction does not involve variation of the position of the pivot axis relative to the base member. Variation of the relative position of the pivot axis and the adjustably supported member is enabled, through the inclination of the supporting surface, in exactly such a way that in every possible position of the adjustably supported member in the exposure direction, the adjustably supported member is pivotable about one and the same pivot axis, namely the pivot axis which has a stationary position relative to the base member.

In the context of the present invention, the term "adjustment mechanism" is to be understood as a mechanism configured to adjust the exposure distance of the shaving surface of the external cutting member relative to the skin supporting surface of the skin supporting member in an assembled and operational condition of the shaving unit and the hair-cutting units of the shaving unit. In embodiments of a shaving unit wherein the external cutting member is resiliently supported relative to the skin supporting member in the exposure direction and biased by a resilient force into a position wherein the exposure distance has a maximum value, the term "exposure distance" is to be understood as said maximum value of the exposure distance.

A first practical embodiment of the shaving unit has the following characteristics:

- the displacement direction of the adjustment member is parallel to the pivot axis;
- the adjustment member is displaceable relative to the adjustably supported member,
- the supporting element is mounted in a fixed position relative to the adjustably supported member,
- the supporting surface of the adjustment member is a conical surface having a center line coinciding with the pivot axis; and
- rotation of the adjustably supported member about the pivot axis is defined by a sliding movement of the supporting element along the supporting surface of the adjustment member in supporting contact therewith.

In this embodiment, the stationary position relative to the base member of the pivot axis about which both the external cutting member and the skin supporting member are rotatable is realized for the one of the external cutting member and the skin supporting member which is the adjustably supported member through the design of the adjustment member with the conical supporting surface. On the basis of the conical shape of the supporting surface, it is achieved that when the exposure of the adjustably supported member is adjusted so as to be further outward or inward relative to the bearing-supported member under the influence of a displacement of the adjustment member, the radial position of the adjustably supported member relative to the pivot axis is automatically adjusted in a similar manner.

In the context of this embodiment, either the skin supporting member is the adjustably supported member and the external cutting member is the bearing-supported member, or the external cutting member is the adjustably supported member and the skin supporting member is the bearing-supported member. In any case, it may be so that the internal cutting member is rotatable relative to the external cutting member about a rotational axis extending parallel to the exposure direction, and that the pivot axis and the displacement direction of the adjustment member extend in a radial direction relative to the rotational axis.

In order to ensure proper control of the position and displacement of the adjustment member, it may be advantageous if the adjustment mechanism comprises a guide member configured to guide the adjustment member in the displacement direction thereof, wherein the adjustment member is slidably arranged on the guide member. In respect of the design and the positioning of the adjustment member, a first practical option is that the supporting surface of the adjustment member is an exterior surface of a part of the adjustment member which has a generally solid appearance, wherein the supporting surface is located at a side of the part of the adjustment member facing the adjustably supported member, and a second practical option is that the adjustment member is provided with an opening and the supporting surface of the adjustment member is provided on a surface of the adjustment member partially delimiting the opening. In the latter case, it may be practical if the supporting element is shaped like some kind of protrusion and is arranged to extend through the opening in the adjustment member.

It may be practical if the adjustment member is arranged to interact with the supporting element at a more or less peripheral position on the adjustably supported member. In such a case, in order to ensure proper displacement of the adjustably supported member in the exposure direction under the influence of displacement of the adjustment member in the displacement direction, it may be advantageous if the adjustment mechanism comprises at least two adjustment members, wherein the supporting surfaces of the respective adjustment members are located at opposite or distributed positions relative to a general peripheral outline of the adjustably supported member about the exposure direction.

A second practical embodiment of the shaving unit has the following characteristics:

- the internal cutting member is rotatable relative to the external cutting member about a rotational axis extending parallel to the exposure direction;
- the displacement direction of the adjustment member is tangential to the rotational axis;
- the adjustment member is mounted in a fixed position relative to the adjustably supported member,
- the supporting element is mounted in a fixed position relative to the base member and has a circular cylindrical surface with a center line coinciding with the pivot axis; and
- rotation of the adjustably supported member about the pivot axis is defined by a rolling movement of the supporting surface of the adjustment member along the circular cylindrical surface of the supporting element in supporting contact therewith.

In this embodiment, the stationary position relative to the base member of the pivot axis about which both the external cutting member and the skin supporting member are rotatable is realized for the one of the external cutting member and the skin supporting member which is the adjustably supported member through the fixed position relative to the base member of the supporting element. This automatically implies that the pivoting movement of the adjustably supported member is always about the same pivot axis. As is the case in the context of the practical first embodiment, when the exposure of the adjustably supported member is adjusted so as to be further outward or inward relative to the bearing-supported member under the influence of a displacement of the adjustment member, the radial position of the adjustably supported member relative to the pivot axis is automatically adjusted in a similar manner, due to the inclination of the supporting surface of the adjustment member.

In the context of the second practical embodiment, it may particularly be so that the external cutting member is the adjustably supported member and the skin supporting member is the bearing-supported member. In that case, it may further be so that the following characteristics are applicable to the shaving unit:

- the adjustment member is an annular member supporting the external cutting member,
- the supporting surface of the adjustment member is provided on an inner surface of a slot provided in the annular member; and
- the supporting element is a supporting pin engaging the slot.

In this respect, it is noted that it is possible to have more than one slot in the annular adjustment member and a supporting pin per slot.

Generally speaking, in order to define discrete exposure positions and to provide an easy way of retaining the adjustably supported member in one of those exposure positions, it is practical if the supporting surface of the adjustment member has a stepped appearance. That does not alter the fact that a continuous appearance of the supporting surface is also possible in the context of the invention.

Embodiments of the shaving unit according to the invention are feasible in which the hair-cutting unit comprises a guiding mechanism configured to guide the adjustably supported member as the adjustably supported member rotates about the pivot axis, wherein the guiding mechanism comprises a sliding arrangement of a first guiding member and a second guiding member at least partially encompassing the first guiding member, and wherein one of the first guiding member and the second guiding member is connected to the adjustably supported member. When the hair-cutting unit comprises such a guiding mechanism, indeed, and the adjustment member is the annular member supporting the external cutting member, it is possible to invoke tangential displacement of the adjustment member at the position of the guiding mechanism, namely by driving the one of the first guiding member and the second guiding member which is not connected to the external cutting member.

In the context of the above-mentioned first practical embodiment of the shaving unit, in the case that the adjustment member is provided with an opening and the supporting element is shaped like some kind of protrusion and is arranged to extend through the opening in the adjustment member, the opening-protrusion combination may serve to also perform the function of guiding the adjustably supported member as the adjustably supported member rotates about the pivot axis, so that an additional guiding mechanism can be omitted.

In the case that the shaving unit according to the invention comprises at least two hair-cutting units, it is practical if the shaving unit also comprises a driven mechanism configured to bring about displacement of the adjustment members of the adjustment mechanisms of the respective hair-cutting units in a synchronized manner. On the other hand, the shaving unit may be configured to allow individual, independent exposure distance adjustment of the respective hair-cutting units.

The above-described and other aspects of the invention will be apparent from and elucidated with reference to the following detailed description of a number of embodiments of a shaving unit for use in an electric shaver.

BRIEF DESCRIPTION OF THE DRAWINGS

The invention will now be explained in greater detail with reference to the figures, in which equal or similar parts are indicated by the same reference signs, and in which:

FIG. 1 diagrammatically shows a perspective view of an electric shaver according to an embodiment of the invention, which electric shaver comprises a shaving unit and a body unit, FIG. 2 diagrammatically shows a perspective view of an external cutting member, a decorative cap and an internal cutting member of a hair-cutting unit of the shaving unit, wherein both the external cutting member and the cap are shown with a portion cut away, FIG. 3 diagrammatically shows a sectional view of a base member, an external cutting member and a skin supporting member of a conventional shaving unit, FIG. 4 provides an illustration of pivoting inaccuracy in an assembly of the external cutting member and the skin supporting member, FIGS. 5 and 6 diagrammatically show a portion of a shaving unit according to a first embodiment of the invention, wherein different relative positions of an external cutting member and a skin supporting member of a hair-cutting unit of the shaving unit are illustrated, FIGS. 7 and 8 diagrammatically show another portion of the shaving unit according to the first embodiment of the invention, wherein also different positions of an adjustment mechanism of the hair-cutting unit are illustrated, FIG. 9 diagrammatically shows a perspective view of an adjustment member of the adjustment mechanism, FIG. 10 diagrammatically shows a perspective view of the skin supporting member, FIG. 11 diagrammatically shows a perspective view of a holder of the external cutting member, FIG. 12 diagrammatically shows a perspective view of a portion of a base member of the shaving unit according to the first embodiment of the invention, FIG. 13 provides an illustration of the working principle of variation of the relative position of the external cutting member and the skin supporting member, FIG. 14 diagrammatically shows a perspective view of an assembly of components of a shaving unit according to a second embodiment of the invention, FIGS. 15 and 16 diagrammatically show a perspective view of the assembly of components of the shaving unit according to the second embodiment of the invention, with parts cut away, wherein different relative positions of an external cutting member and a skin supporting member of a hair-cutting unit of the shaving unit are illustrated, and wherein

DETAILED DESCRIPTION OF THE EMBODIMENTS

Figure 1:
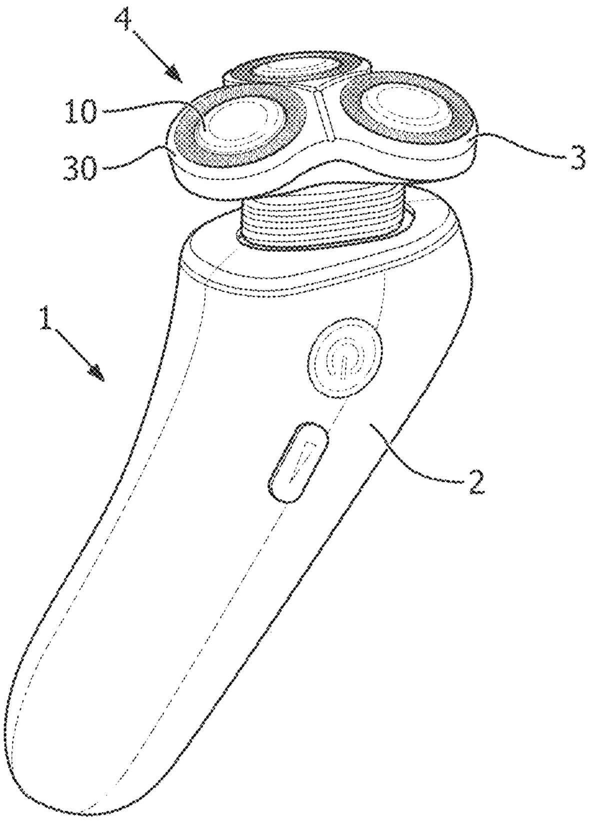

FIG. 1 shows an electric shaver of the rotary type, which is suitable to be used for shaving a beard, as a practical example of an electric shaver 1 according to an embodiment of the invention. The electric shaver 1 comprises a body unit 2 and a shaving unit 3, wherein the body unit 2 is designed to enable a user of the electric shaver 1 to take hold of the electric shaver 1 and to handle the electric shaver 1, and wherein the shaving unit 3 is the part of the electric shaver 1 that is to be positioned on and moved over the skin for hair removal. In the shown example, the shaving unit 3 three hair-cutting units 4. When the electric shaver 1 is actually applied for the purpose of performing a shaving action, the actual process of cutting of hairs protruding from the skin takes place at the position of the hair-cutting units 4.

Figure 2:
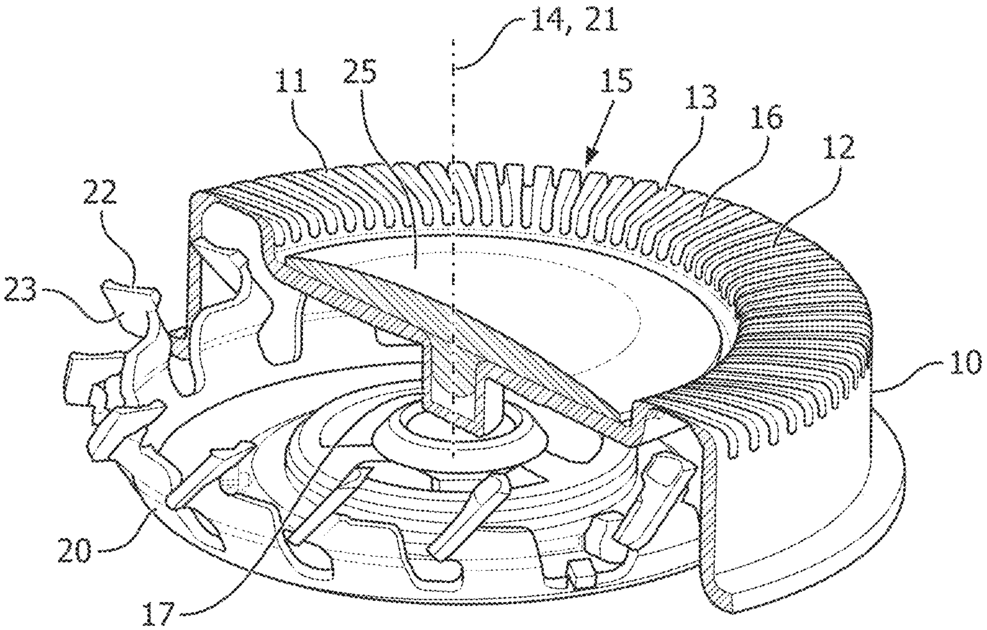

Each of the hair-cutting units 4 comprises a combination of an external cutting member 10 and an internal cutting member 20, as will now be described in more detail with reference to FIG. 2. The external cutting member 10 is of a generally cup-shaped design and is thereby suitable for at least partially accommodating the internal cutting member 20 in its interior. At an exterior side thereof, the external cutting member 10 has a shaving surface 11 configured to face the skin to be subjected to a shaving action. Further, an annular hair-cutting track 12 is present in the external cutting member 10, which hair-cutting track 12 comprises lamellae 13 extending along the width of the hair-cutting track 12, in a substantially radial direction relative to a longitudinal axis 14 of the external cutting member 10, which coincides with a rotational axis 21 about which the internal cutting member 20 is rotatable relative to the external cutting member 10. Apertures as present between the lamellae 13 constitute hair-entry openings 15 of the hair-cutting track 12. Sides of the lamellae 13 constitute hair-cutting surfaces 16 suitable for cutting off hairs in cooperation with hair-cutting edges 22 of hair-cutting elements 23 of the internal cutting member 20. The invention also relates to cases in which the hair-cutting track 12 does not comprise lamellae 13 or does not only comprise lamellae 13, such as cases in which the entire hair-cutting track 12 is provided with teeth-like elements and/or a pattern of (circular) holes instead of or in addition to lamellae 13. Also, the invention relates to cases in which more than one hair-cutting track 12 is present in the external cutting member 10.

A hair-cutting action can be performed when the internal cutting member 20 is activated to rotate and a portion of skin is actually contacted by the external cutting member 10 at the position of the hair-cutting track 12. Activation of the internal cutting member 20 may take place in a known manner by means of a drive mechanism of the electric shaver 1, which is not shown in the figures. When the combination of the external cutting member 10 and the internal cutting member 20 is moved over the portion of skin while the internal cutting member 20 is driven to rotate, it is achieved that hairs protruding from the portion of skin are caught in the hair-entry openings 15 of the hair-cutting track 12 of the external cutting member 10 and are cut off in that position as result of a cooperation between the hair-cutting surfaces 16 of the hair-cutting track 12 of the external cutting member 10 and the hair-cutting edges 22 of the hair-cutting elements 23 of the rotating internal cutting member 20.

Besides the hair-cutting track 12, the external cutting member 10 includes a central portion 17 comprising a central bearing portion which is designed to be used in rotationally supporting the internal cutting member 20 in the hair-cutting unit 4. The central portion 17 of the external cutting member 10 also serves for supporting a decorative cap 25 configured to cover part of the exterior surface of the external cutting member 10. In the shown example, the central portion 17 comprises a centrally located recess, and the cap 25 comprises a projection which is accommodated in the recess.

Each of the hair-cutting units 4 further comprises a skin supporting member 30. The skin supporting member 30 has a skin supporting surface 31 surrounding the external cutting member 10.

Figure 3:
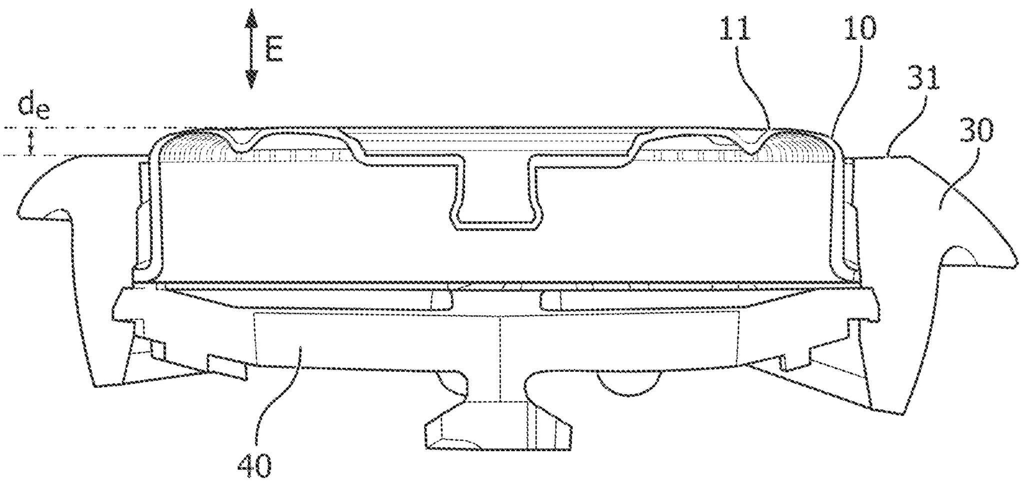

FIG. 3 shows a base member 40, an external cutting member 10 and a skin supporting member 30 of a conventional shaving unit in which these members are in a fixed arrangement with respect to each other. Thus, in this conventional shaving unit, an exposure distance $d_e$ over which the shaving surface 11 protrudes relative to the skin supporting surface 31 in an exposure direction E is fixed. The invention, on the other hand, provides a shaving unit in which the exposure distance $d_e$ is variable, as will be explained later in more detail. A practical example of a range of the exposure distance $d_e$ is 0.3 mm to 0.9 mm. An advantage of enabling adjustment of the exposure distance $d_e$ is that a user is allowed to personalize the shaving experience as far as the balance of closeness and comfort is concerned.

Figure 4:
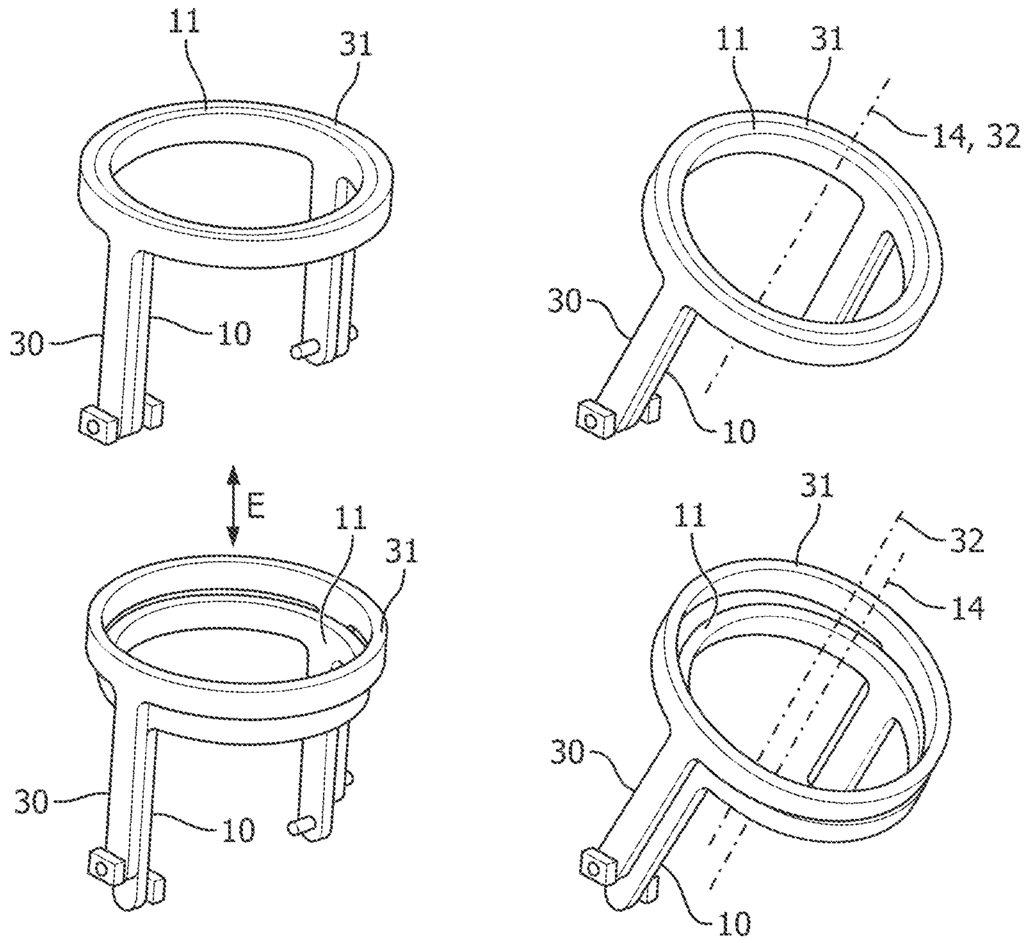
Figure 5:
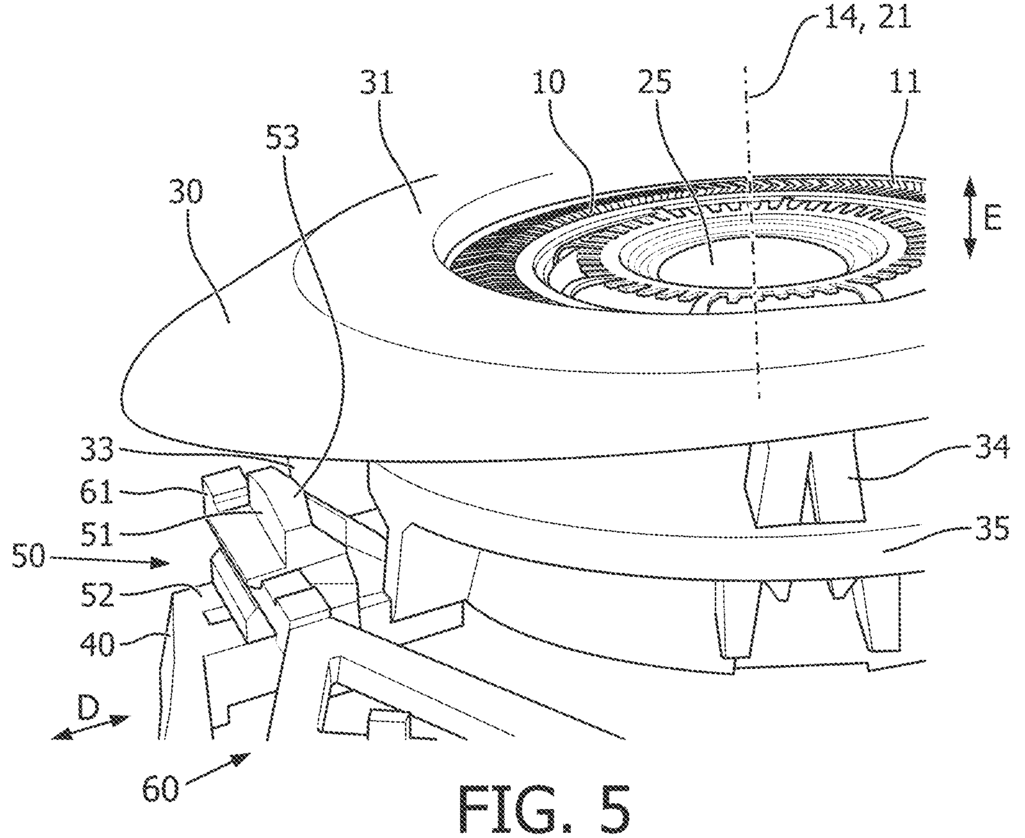
Figure 6:
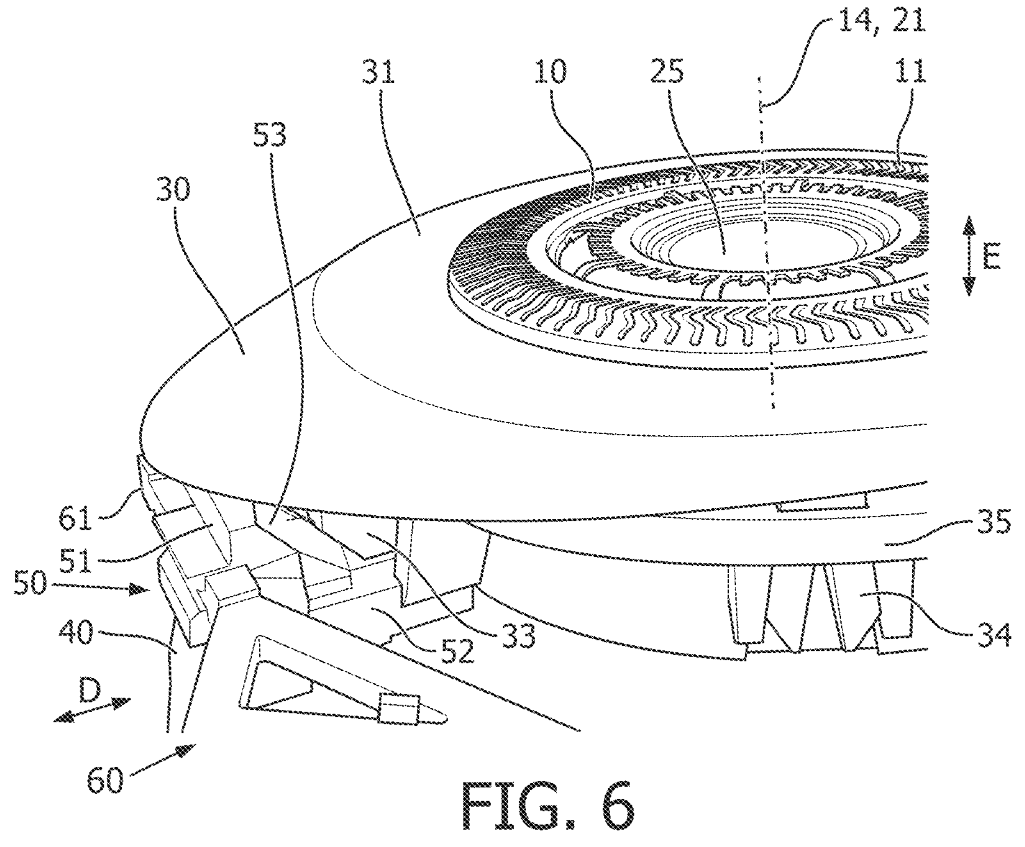
Figure 7:
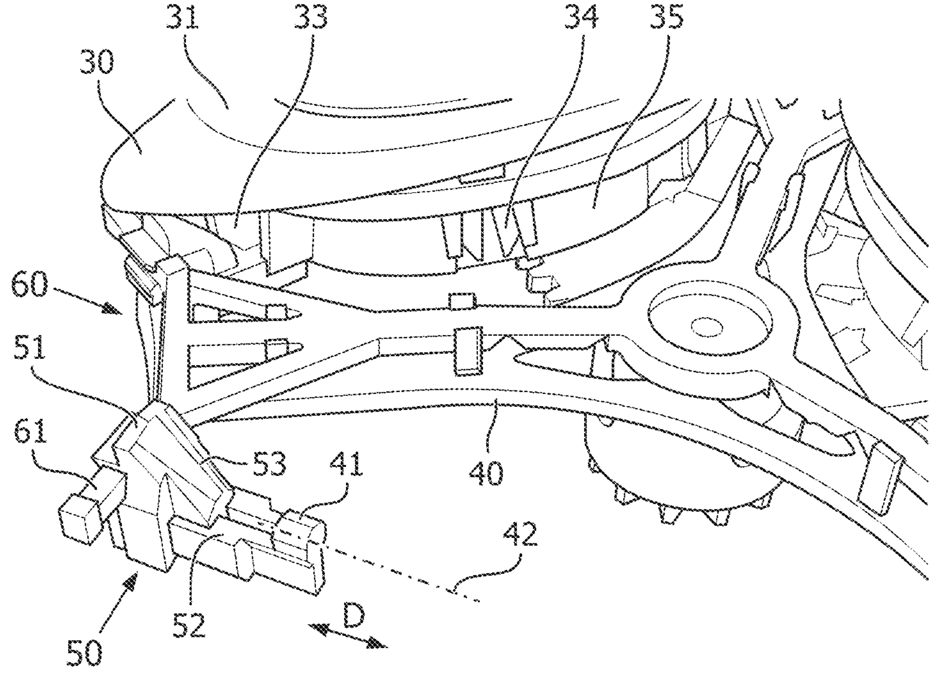
Figure 8:
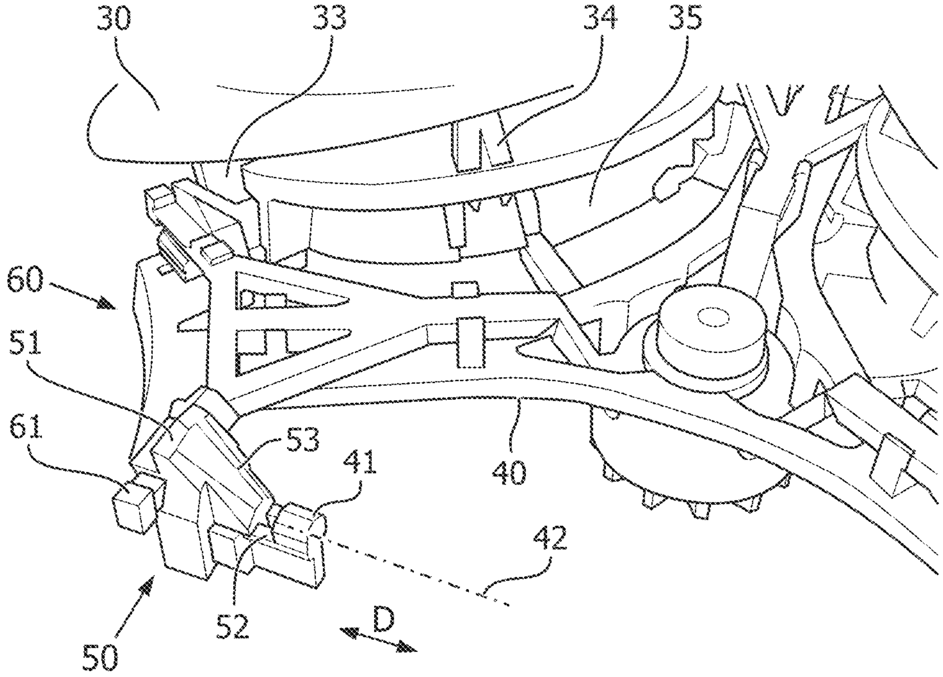
Figure 9:
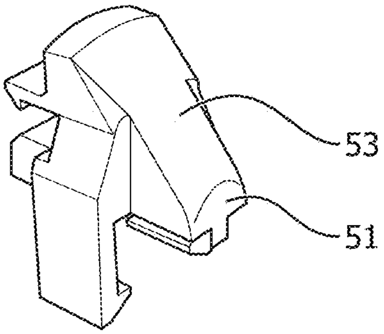
Figure 10:
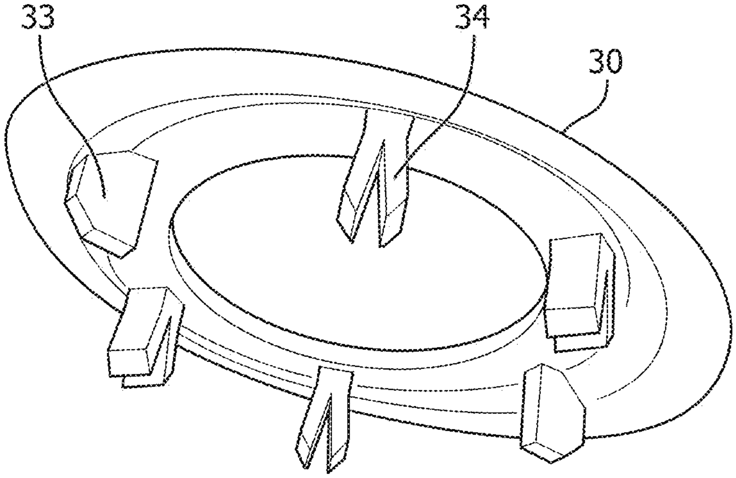

A complicating factor in the context of varying exposure is obtained when it is desired to have a configuration in which the external cutting member 10 and the skin supporting member 30 are pivotable relative to the base member 40 so as to allow contour following during a shaving action. Simply varying the relative position of the external cutting member 10 and the skin supporting member 30 by varying the position of one of those members 10, 30 in the exposure direction E results in varying the exposure distance $d_e$, indeed, but will lead to inaccuracy when pivoting, as can be seen in FIG. 4. At the top side of FIG. 4, it is shown that when the exposure distance $d_e$ is 0.0 mm and the external cutting member 10 and the skin supporting member 30 are pivoted, the longitudinal axis 14 of the external cutting member 10 and a longitudinal axis 32 of the skin supporting member 30 are aligned. At the bottom side of FIG. 4, it is shown that when the exposure distance $d_e$ deviates from 0.0 mm and the external cutting member 10 and the skin supporting member 30 are pivoted, the longitudinal axis 14 of the external cutting member 10 and a longitudinal axis 32 of the skin supporting member 30 are no longer aligned. This is a problem that is alleviated by the invention. The invention provides constructional measures according to which a pivot axis of both the external cutting member 10 and the skin supporting member 30 remains stationary under all circumstances, that is to say, also when one of the external cutting member 10 and the skin supporting member 30 is displaced in the exposure direction E, as will become apparent from the following explanation of three embodiments of the shaving unit 3 according to the invention.

Aspects of the design of a shaving unit 3 according to a first embodiment of the invention and aspects of the functioning of the shaving unit 3 are addressed in the following with reference to FIGS. 5-13.

Besides the external cutting member 10, the internal cutting member 20 and the skin supporting member 30, each hair-cutting unit 4 of the shaving unit 3 comprises an adjustment mechanism 50 configured to adjust the exposure distance $d_e$. The adjustment mechanism 50 comprises two sets of an adjustment member 51 and a guide member 52, wherein the sets are positioned at diametrically opposed peripheral positions of the combination of the external cutting member 10 and the skin supporting member 30. The guide member 52 has a fixed arrangement relative to the base member 40 by being integrated in the base member 40, and the adjustment member 51 is slidable on the guide member 52. In particular, the adjustment member 51 is movable relatively to the base member 40 in a displacement direction D in an imaginary plane perpendicular to the exposure direction E, which displacement direction D is a radial direction relative to the longitudinal axis 14 of the external cutting member 10 and the rotational axis 21 of the internal cutting member 20. The adjustment member 51 is shown separately in FIG. 9.

In the shaving unit 3 according to the first embodiment of the invention, it is the skin supporting member 30 which is displaceable in the exposure direction E for the purpose of varying the exposure distance $d_e$. The skin supporting member 30 is shown separately in FIG. 10, and it can be seen that the skin supporting member 30 has two pillars 33 which are provided with a chamfered edge. The skin supporting member 30 is supported relative to the base member 40 via respective inclined supporting surfaces 53 of the adjustment members 51 and the pillars 33 in supporting contact with the respective supporting surfaces 53 of the adjustment members 51. The respective inclined supporting surfaces 53 of the adjustment members 51 contact the respective chamfered edges of the pillars 33 of the skin supporting member 30, and the pillars 33 having the chamfered edge function as supporting elements of the skin supporting member 30 in supporting contact with the respective supporting surfaces 53 of the adjustment members 51. In this configuration, it is achieved that when the adjustment members 51 are moved radially inward, the skin supporting member 30 is lifted, and when the adjustment members 51 are moved radially outward, the skin supporting member 30 is lowered.

The shaving unit 3 according to the first embodiment of the invention may comprise any suitable driven mechanism 60 for bringing about displacement of the adjustment members 51 in the displacement direction D. In the shown example, the driven mechanism 60 comprises arms 61 which are in sliding contact with the adjustment members 51 and which can be pulled inwardly towards a center of the shaving unit 3 and pushed outwardly away from the center, to thereby be capable to push and pull the adjustment members 51 on the guide members 52. The driven mechanism 60 is configured to bring about displacement of the adjustment members 51 of the adjustment mechanisms 50 of the respective hair-cutting units 4 of the shaving unit 3 in a synchronized manner. In the context of the electric shaver 1, it is intended to let the setting of the mechanism 60 be determined on the basis of user input reflecting the user's personal preference in respect of a desired balance of closeness and comfort, so as to realize an appropriate setting of the exposure distance $d_e$.

Figure 11:
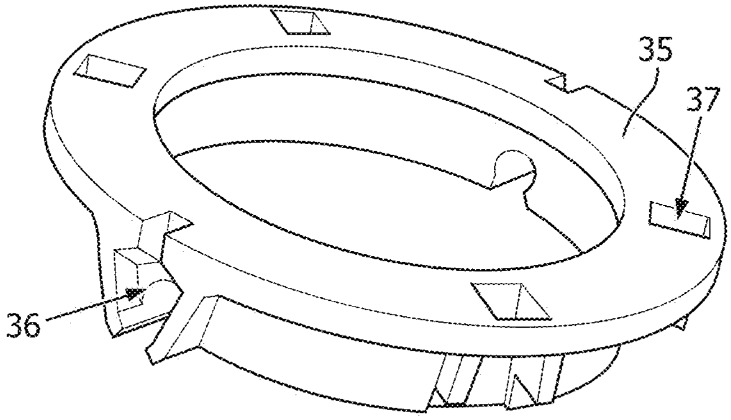
Figure 12:
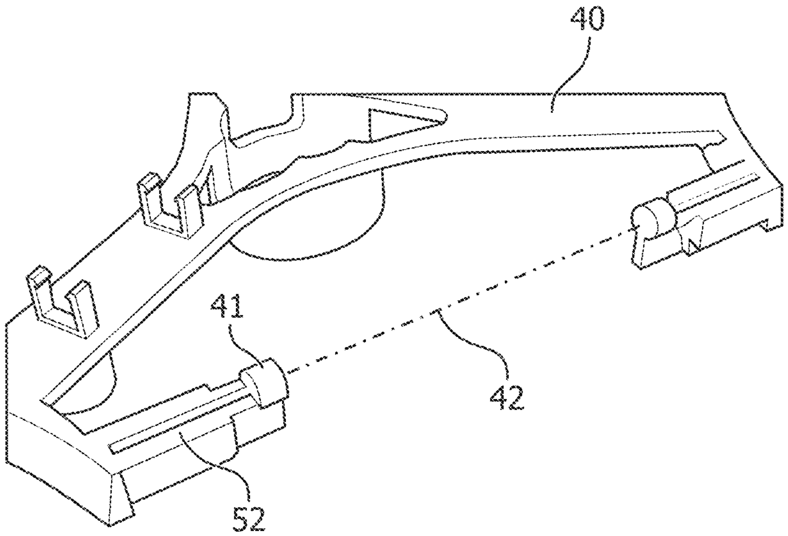

The external cutting member 10 is retained in an annular holder 35, which is shown separately in FIG. 11. The skin supporting member 30 comprises four other pillars 34 besides the pillars 33 having the chamfered edge, each of those pillars 34 including two legs, and the holder 35 is provided with two peripheral recesses 36 for accommodating the two pillars 33 having the chamfered edge and four holes 37 for accommodating the other four pillars 34. When the skin supporting member 30 is moved up and down for varying the exposure distance $d_e$, the pillars 33, 34 move in the recesses 36 and holes 37 and are guided in the recesses 36 and holes 37 in the process. At the position of the recesses 36 for accommodating the pillars 33 having the chamfered edge, the holder 35 is rotatably connected to the base member 40. As can be seen in FIG. 12, in which a portion of the base member 40 is shown, the base member 40 has two pin-shaped members 41 in opposite configuration, at end positions of the guide members 52 of the adjustment mechanism 50, wherein a center line of the pin-shaped members 41 extends in the displacement direction D of the adjustment members 51, as defined by the guide members 52. During assembly of the hair-cutting unit 4, those pin-shaped members 41 are received in a portion of the recess 36 delimited by two legs which are configured such that a snap connection between the holder 35 and the base member 40 is realized, wherein the holder 35 is rotatable relative to the base member 40 about a pivot axis 42 defined by the center line of the pin-shaped members 41.

Figure 13:
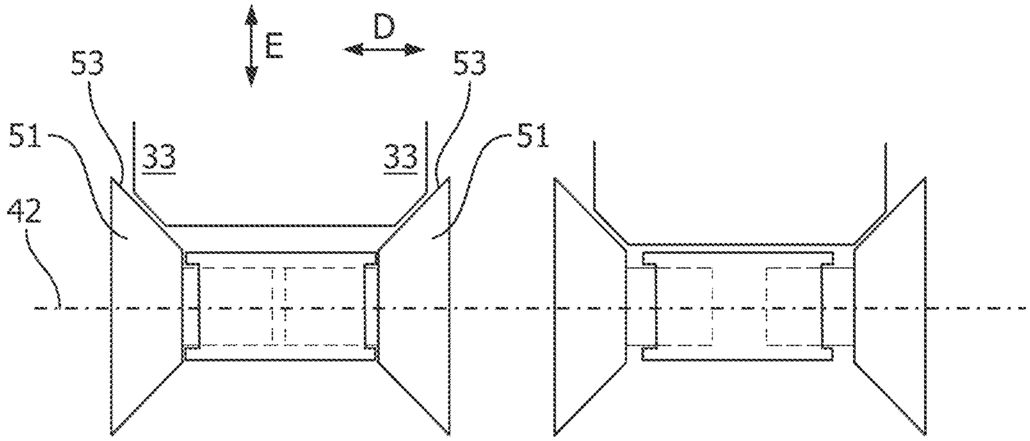

As explained earlier, the skin supporting member 30 is also pivotably arranged, and in order to avoid pivoting inaccuracy, constructional measures are taken to ensure that the skin supporting member 30 is rotatable about the same pivot axis 42 as the assembly of the external cutting member 10 and the holder 35, for all possible positions of the skin supporting member 30 in the exposure direction E. In the case of the shaving unit 3 according to the first embodiment of the invention, those constructional measures involve a conical shape of the supporting surface 53 of each of the adjustment members 51, which conical shape is such that the center line thereof coincides with the pivot axis 42. This aspect of the shaving unit 3 is reflected in FIG. 13, which serves to illustrate the interaction between the supporting surfaces 53 of the respective adjustment members 51 and the chamfered edges of the respective pillars 33 of the skin supporting member 30. When the adjustment members 51 are moved further apart, as is the case when a transition from the configuration at the left side of FIG. 13 to the configuration at the right side of FIG. 13 is imagined, the skin supporting member 30 is lowered, while the pivot axis 42 about which the skin supporting member 30 is rotatable is stationary because the pivot axis 42 is defined by the center line of the conical shape of the supporting surfaces 53. Similarly, the pivot axis 42 remains stationary when the adjustments members 51 are moved towards each other and the skin supporting member 30 is lifted. Thus, by applying the adjustment members 51 having the supporting surfaces 53 which are in contact to the skin supporting member 30, and choosing the conical shape of the supporting surfaces 53 such that the center line of the conical shape coincides with the center line of the pin-shaped members 41 of the base member 40, it is achieved that it is possible to vary the exposure distance $d_e$ and to ensure that the skin supporting member 30 is rotatable about the same pivot axis 42 as the external cutting member 10. In this way, having the option of varying the exposure distance $d_e$ does not compromise the contour following functionality of the hair-cutting unit 4 in any way, wherein pivoting inaccuracy is avoided.

Figure 14:
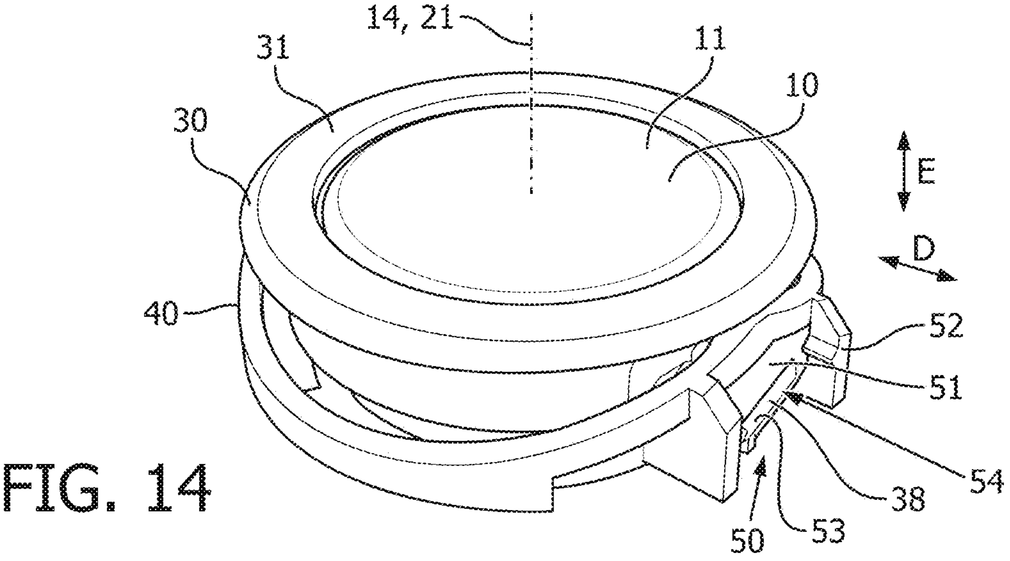

Aspects of the design of a shaving unit 3 according to a second embodiment of the invention and aspects of the functioning of the shaving unit 3 are addressed in the following with reference to FIGS. 14-16. It is to be noted that the external cutting member 10 is shown in a simplified fashion in FIGS. 14-16, without the hair-entry openings 15.

In fact, the working principle of the shaving unit 3 according to the second embodiment of the invention is similar to the working principle of the shaving unit 3 according to the first embodiment of the invention. In particular, the shaving unit 3 according to the second embodiment of the invention also comprises an adjustment mechanism 50 having two adjustment members 51 which are displaceable in a radial direction relative to the longitudinal axis 14 of the external cutting member 10 and the rotational axis 21 of the internal cutting member 20, and the adjustment members 51 also have a conical supporting surface 53 of which a center line coincides with a pivot axis 42 of a pivotal arrangement of one of the external cutting member 10 and the skin supporting member 30 on the base member 40. In the case of the shaving unit 3 according to the second embodiment of the invention, it is the external cutting member 10 that is displaceable in the exposure direction E, and it is the skin supporting member 30 that is rotatably connected to the base member 40. The adjustment members 51 are provided with an opening 54 and the supporting surface 53 of the adjustment members 51 is provided on a surface of the adjustment members 51 partially delimiting the opening 54. The annular holder 35 retaining the external cutting member 10 is provided with inclined protrusions 38 extending through the openings 54 of the respective adjustment members 51. In the case of the shaving unit 3 according to the second embodiment of the invention, each of the protrusions 38 functions as a supporting element in supporting contact with the supporting surface 53 of the respective adjustment members 51.

Figure 15:
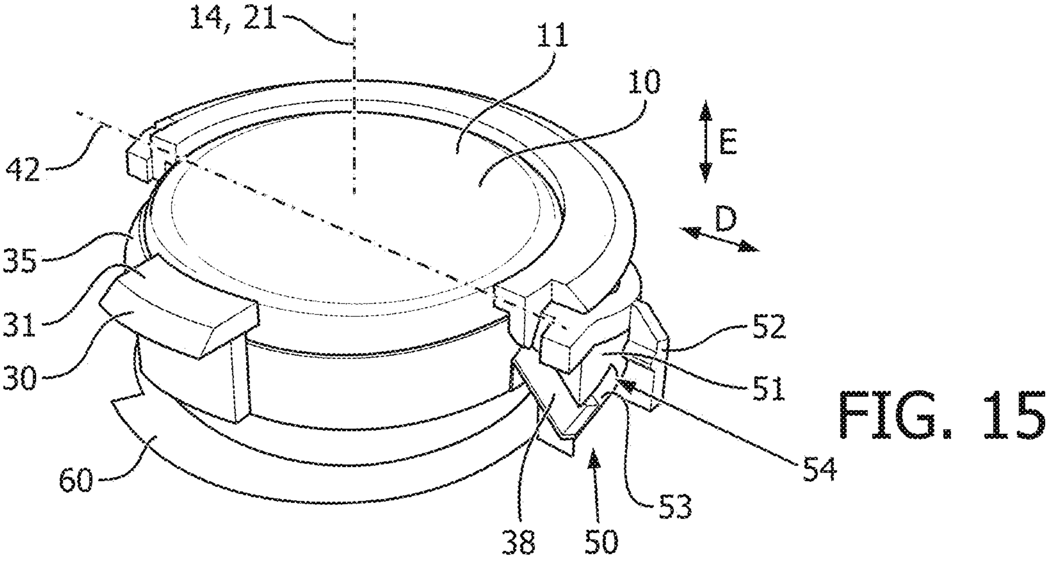
Figure 16:
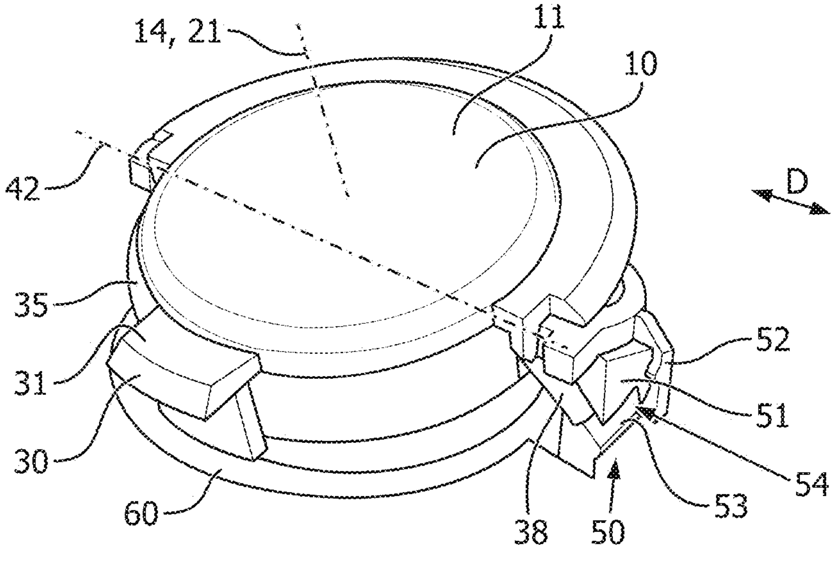
FIG. 16 illustrates a pivoted position of the external cutting member and the skin supporting member, FIGS. 17 and 18 diagrammatically show a portion of a shaving unit according to a third embodiment of the invention, wherein different relative positions of an external cutting member and a skin supporting member of a hair-cutting unit of the shaving unit are illustrated, FIGS. 19 and 20 also diagrammatically show a portion of the shaving unit according to the third embodiment of the invention, wherein different pivoted positions of the external cutting member and the skin supporting member are illustrated.

Two different relative positions of the external cutting member 10 and the skin supporting member 30 are shown in FIGS. 15 and 16. In FIG. 15, the external cutting member 10 is lower relative to the skin supporting member 30, whereas in FIG. 16, the external cutting member 10 is higher relative to the skin supporting member 30. In the first case, closeness of the shave is less while skin comfort is relatively high, and in the second case, closeness of the shave is improved while skin comfort is decreased. It can be derived from FIGS. 15 and 16 that in the first case, the adjustment members 51 are at a more radially inward position and the inclined protrusions 38 of the holder 35 of the external cutting member 10 extends further through the openings 54 of the respective adjustment members 51. Further, it is noted that FIG. 15 shows the external cutting member 10 and the skin supporting member 30 in a neutral, non-pivoted position, while FIG. 16 illustrates a pivoted position of the external cutting member 10 and the skin supporting member 30. The shape of the opening 54 in the respective adjustment members 51 is such that the inclined protrusions 38 of the holder 35 have space for moving in the opening 54 when a pivoting movement is made and are guided in the process. It is emphasized once more that the pivoting movement of both the external cutting member 10 and the skin supporting member 30 is always about the pivot axis 42 as defined by the rotatable connection of the skin supporting member 30 to the base member 40, and that this is related to the conical shape of the supporting surface 53 of the respective adjustment members 51 as far as the external cutting member 10 is concerned.

Aspects of the design of a shaving unit 3 according to a third embodiment of the invention and aspects of the functioning of the shaving unit 3 are addressed in the following with reference to FIGS. 17-22. It is to be noted that the external cutting member 10 is shown in a simplified fashion in FIGS. 17-21, without the hair-entry openings 15.

In the shaving unit 3 according to the third embodiment of the invention, it is the external cutting member 10 which is displaceable in the exposure direction E for the purpose of varying the exposure distance $d_e$. The adjustment member 51 of the adjustment mechanism 50 is an annular member supporting the external cutting member 10, and the displacement direction D of the adjustment member 51 is tangential to the longitudinal axis 14 of the external cutting member 10 and the rotational axis 21 of the internal cutting member 20, in other words, the annular adjustment member 51 is arranged so as to be rotatable about its central longitudinal axis. Further, the annular adjustment member 51 is provided with two slots 55 at diametrically opposed positions on the adjustment member 51, wherein an inner surface of each of the slots 55 functions as the supporting surface 53 of the adjustment member 51. The supporting elements interacting with the supporting surfaces 53 are two supporting pins 43 in opposite configuration, which are part of the base member 40, and which also serve to rotatably support the skin supporting member 30.

In the above-described configuration, a center line of the supporting pins 43 define a pivot axis 42 for the skin supporting member 30, and also for the external cutting member 10, in any possible position of the supporting pins 43 in the respective slots 55 of the adjustment member 51. The hair-cutting unit 4 comprises a guiding mechanism 70 configured to guide the external cutting member 10 as the external cutting member 10 rotates about the pivot axis 42, wherein the guiding mechanism 70 comprises a first guiding member 71 sliding in a second guiding member 72, wherein the first guiding member 71 is arranged on the adjustment member 51. Invoking a displacement of the adjustment member 51 in the tangential displacement direction D is done by invoking a tangential movement of the second guiding member 72, which is slidably arranged on a guiding rib 73 provided on the base member 40. In the shown example, a driven gear wheel 62 is in engagement with the second guiding member 72, which does not alter the fact that a mechanism 60 for moving the second guiding member 72 may be designed in another way. Also, there is no need to apply the same components for performing the function of guiding the external cutting member 10 in the pivoting movement and the function of moving the adjustment element 51, although it may be practical to do so in order to reduce complexity of construction.

Figure 17:
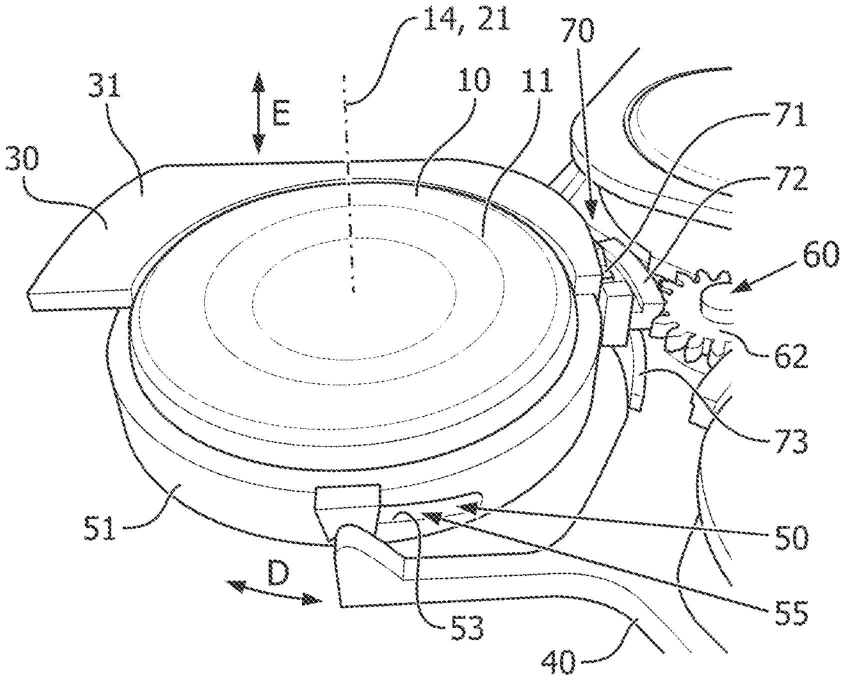
Figure 18:
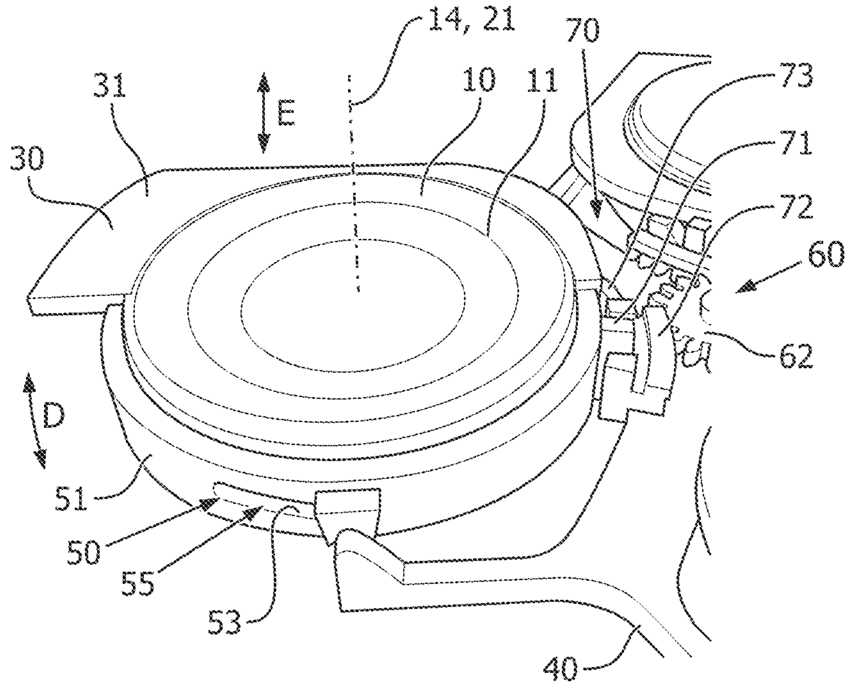
Figure 19:
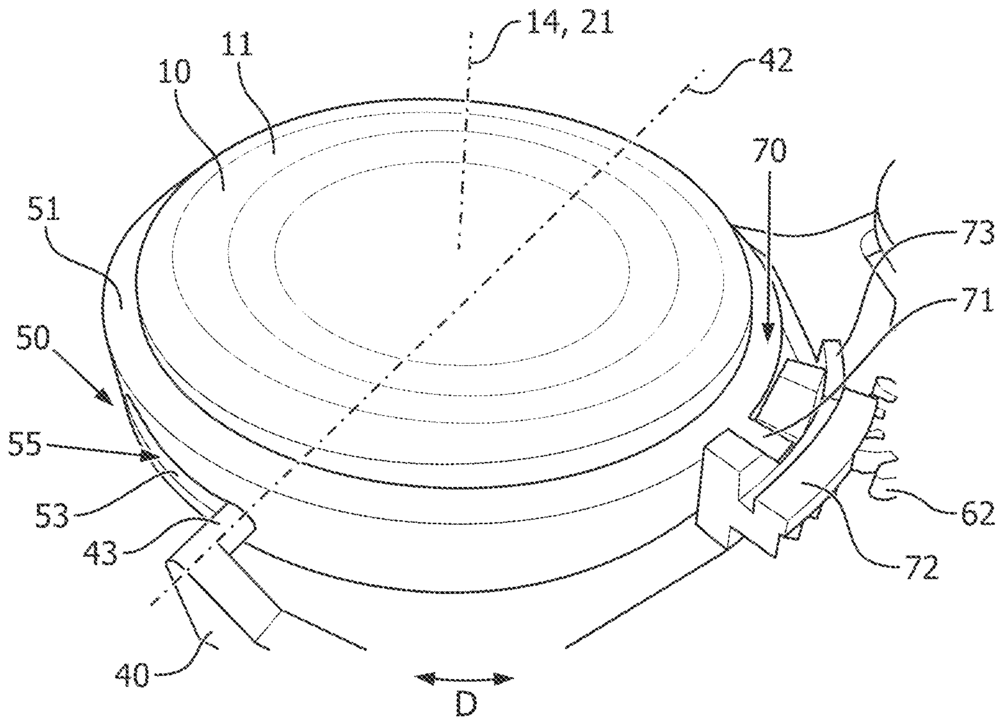
Figure 20:
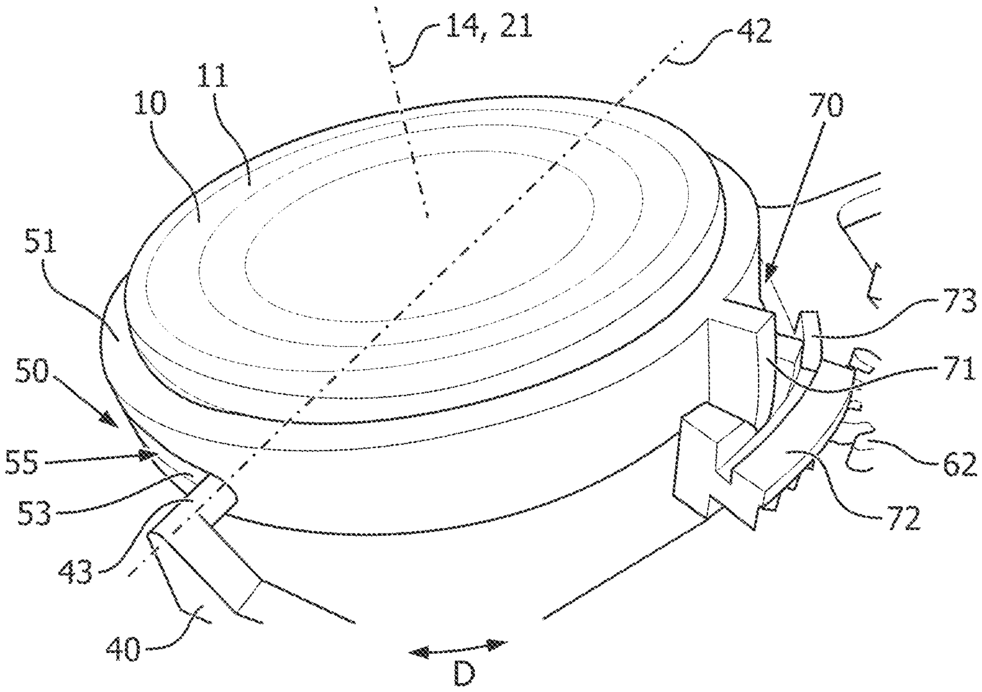
Figure 21:
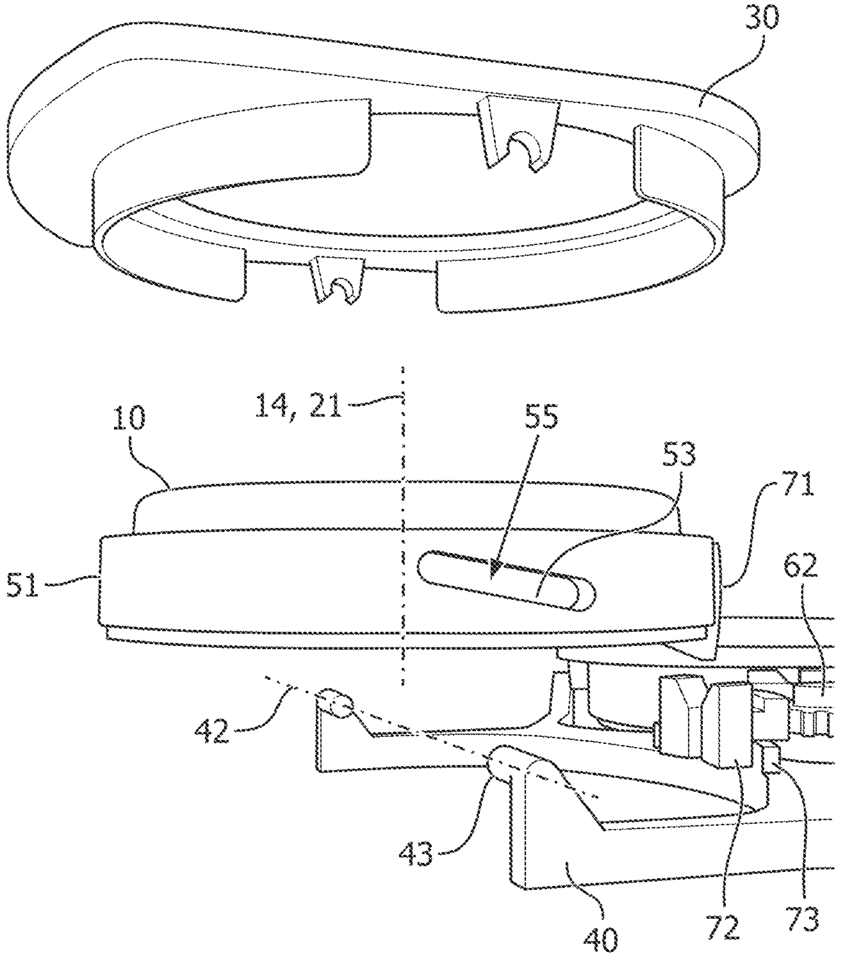
FIG. 21 shows an exploded view of components of the shaving unit according to the third embodiment of the invention, including the external cutting member, the skin supporting member and an adjustment member of a hair-cutting unit of the shaving unit, and FIG. 22 provides an illustration of the working principle of variation of the relative position of the external cutting member and the skin supporting member.

FIGS. 17 and 18 show the two extreme positions of the adjustment member 51, with the supporting pin 43 at the one end of the slot 55, and the supporting pin 43 at the other end of the slot 55, respectively. In the position shown in FIG. 17, the lowest position of the external cutting member 10 relative to the skin supporting member 30 is set, and in the position shown in FIG. 18, the highest position of the external cutting member 10 relative to the skin supporting member 30 is set. FIGS. 19 and 20 show different pivoted positions of the external cutting member 10 and the skin supporting member 30. Especially the differences in the relative positions of the first guiding member 71 and the second guiding member 72 can clearly be seen in the figures.

Figure 22:
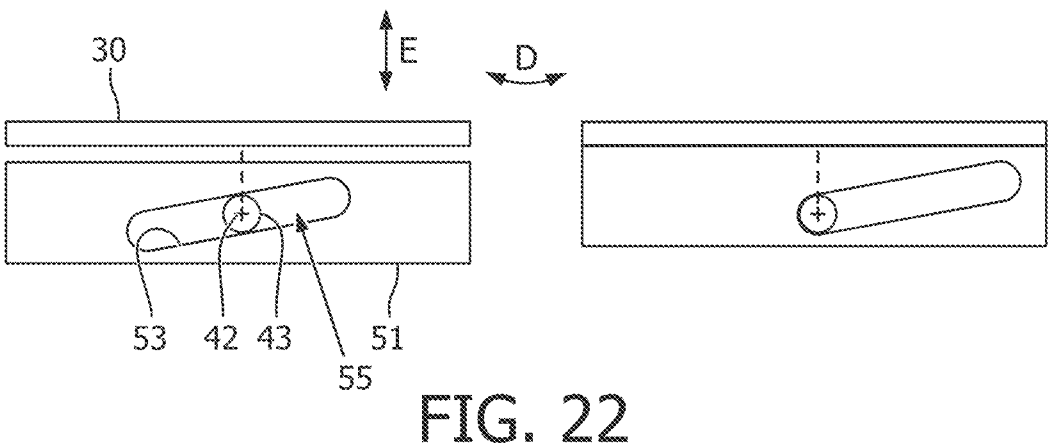

FIG. 22 serves to illustrate that when the adjustment member 51 is displaced in the tangential displacement direction D, the interaction of the supporting surface 53 and the stationary supporting pin 43 automatically causes adjustment of the position in the exposure direction E of the adjustment member 51 relative to the skin supporting member 30 and thereby of the external cutting member 10 relative to the skin supporting member 30. In the process, the pivot axis 42 of the external cutting member 10 remains stationary as the pivot axis 42 is defined by the stationary supporting pin 43, so that the situation in which the external cutting member 10 and the skin supporting member 30 are rotatable about the same pivot axis 42 is maintained while pivoting inaccuracy is avoided.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details which are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The terms "comprise" and "include" as used in this text will be understood by a person skilled in the art as covering the term "consist of". Hence, the term "comprise" or "include" may in respect of an embodiment mean "consist of", but may in another embodiment mean "contain/have/be equipped with at least the defined species and optionally one or more other species".

In the present text, an action of hair removal from skin is generally referred to as shaving action, and this is at the basis of the use of terms such as "shaving unit" and "electric shaver". It is to be noted that the present choice for the shaving terminology should not be understood so as to restrict the invention in any way. Hence, the invention just as well covers hair removal units and devices which may normally be denoted by other terms in the relevant field.

Notable aspects of the invention are summarized as follows. A hair-cutting unit 4 comprises an external cutting member 10 having a shaving surface 11 provided with hair-entry openings 15, an internal cutting member 20, and a skin supporting member 30 having a skin supporting surface 31 surrounding the external cutting member 10. The hair-cutting unit 4 is further equipped with an adjustment mechanism 50 configured to adjust an exposure distance $d_e$ over which the shaving surface 11 protrudes relative to the skin supporting surface 31 in an exposure direction E, whereby a user is enabled to choose a balance between closeness of the shave and skin comfort. The external cutting member 10 and the skin supporting member 30 are jointly pivotal about a stationary pivot axis 42. The adjustment mechanism 50 is designed such that the stationary character of the pivot axis 42 can be maintained for every possible relative position of the external cutting member 10 and the skin supporting member 30, so that having the adjustment mechanism 50 does not involve an introduction of pivoting inaccuracy in the form of misalignment of the external cutting member 10 and the skin supporting member 30. In view thereof, the fact is that when the invention is put to practice, a well-functioning combination of the adjustment mechanism 50 and the pivoting arrangement of the external cutting member 10 and the skin supporting member 30 is realized.

The invention claimed is:

1. Shaving unit configured to be used in an electric shaver, comprising a base member and at least one hair-cutting unit supported by the base member, wherein the hair-cutting unit comprises:

an external cutting member having a shaving surface provided with hair-entry openings;

an internal cutting member which is movable relative to the external cutting member;

a skin supporting member having a skin supporting surface surrounding the external cutting member; and an adjustment mechanism configured to adjust, in an assembled and operational condition of the shaving unit and the hair-cutting units of the shaving unit, an exposure distance over which the shaving surface protrudes relative to the skin supporting surface in an exposure direction;

wherein the external cutting member and the skin supporting member are jointly pivotal about a pivot axis which has a stationary position relative to the base member;

the adjustment mechanism comprises an adjustment member which is displaceable relative to the base member in a displacement direction in an imaginary plane perpendicular to the exposure direction for adjustment of the exposure distance;

the adjustment member comprises a supporting surface which is inclined relative to the displacement direction;

one of the external cutting member and the skin supporting member is a bearing-supported member supported relative to the base member via a bearing allowing a rotation of the bearing-supported member about the pivot axis; and the other one of the external cutting member and the skin supporting member is an adjustably supported member supported relative to the base member via the supporting surface of the adjustment member and a supporting element in supporting contact with the supporting surface of the adjustment member, wherein, in each position of the adjustment member relative to the base member in the displacement direction, a rotation of the adjustably supported member about the pivot axis is defined by mutual movement of the supporting surface of the adjustment member and the supporting element in supporting contact with each other.

2. Shaving unit as claimed in claim 1, wherein:

the displacement direction of the adjustment member is parallel to the pivot axis;

the adjustment member is displaceable relative to the adjustably supported member;

the supporting element is mounted in a fixed position relative to the adjustably supported member;

the supporting surface of the adjustment member is a conical surface having a center line coinciding with the pivot axis; and rotation of the adjustably supported member about the pivot axis is defined by a sliding movement of the supporting element along the supporting surface of the adjustment member in supporting contact therewith.

3. Shaving unit as claimed in claim 2, wherein the skin supporting member is the adjustably supported member, and wherein the external cutting member is the bearing-supported member.

4. Shaving unit as claimed in claim 3, wherein the internal cutting member is rotatable relative to the external cutting member about a rotational axis extending parallel to the exposure direction, wherein the pivot axis and the displacement direction of the adjustment member extend in a radial direction relative to the rotational axis.

5. Shaving unit as claimed in claim 2, wherein the external cutting member is the adjustably supported member, and wherein the skin supporting member is the bearing-supported member.

6. Shaving unit as claimed in claim 2, wherein the adjustment mechanism comprises a guide member configured to guide the adjustment member in the displacement direction thereof, and wherein the adjustment member is slidably arranged on the guide member.

7. Shaving unit as claimed in claim 2, wherein either the supporting surface of the adjustment member is an exterior surface of a part of the adjustment member which has a generally solid appearance, wherein the supporting surface is located at a side of the part of the adjustment member facing the adjustably supported member, or the adjustment member is provided with an opening and the supporting surface of the adjustment member is provided on a surface of the adjustment member partially delimiting the opening.

8. Shaving unit as claimed in claim 2, wherein the adjustment mechanism comprises at least two adjustment members, and wherein the supporting surfaces of the respective adjustment members are located at opposite or distributed positions relative to a general peripheral outline of the adjustably supported member about the exposure direction.

9. Shaving unit as claimed in claim 1, wherein:

the internal cutting member is rotatable relative to the external cutting member about a rotational axis extending parallel to the exposure direction;

the displacement direction of the adjustment member is tangential to the rotational axis;

the adjustment member is mounted in a fixed position relative to the adjustably supported member;

the supporting element is mounted in a fixed position relative to the base member and has a circular cylindrical surface with a center line coinciding with the pivot axis; and rotation of the adjustably supported member about the pivot axis is defined by a rolling movement of the supporting surface of the adjustment member along the circular cylindrical surface of the supporting element in supporting contact therewith.

10. Shaving unit as claimed in claim 9, wherein the external cutting member is the adjustably supported member, and wherein the skin supporting member is the bearing-supported member.

11. Shaving unit as claimed in claim 10, wherein:

the adjustment member is an annular member supporting the external cutting member;

the supporting surface of the adjustment member is provided on an inner surface of a slot provided in the annular member; and the supporting element is a supporting pin engaging the slot.

12. Shaving unit as claimed in claim 1, wherein the supporting surface) of the adjustment member has a stepped appearance.

13. Shaving unit as claimed in claim 1, wherein the hair-cutting unit comprises a guiding mechanism configured to guide the adjustably supported member as the adjustably supported member rotates about the pivot axis, wherein the guiding mechanism comprises a sliding arrangement of a first guiding member and a second guiding member at least partially encompassing the first guiding member, and wherein one of the first guiding member and the second guiding member is connected to the adjustably supported member.

14. Shaving unit as claimed in claim 1, comprising at least two hair-cutting units and a driven mechanism configured to bring about displacement of the adjustment members of the adjustment mechanisms of the respective hair-cutting units in a synchronized manner.

15. Electric shaver comprising a shaving unit as claimed in claim 1 and a body unit to which the shaving unit is couplable or coupled and in which components of a drive system configured to drive components of the shaving unit which are movably arranged in the shaving unit are accommodated.

* * * * *